United States Patent [19]
Pawlowski et al.

[11] Patent Number: 5,919,254
[45] Date of Patent: *Jul. 6, 1999

[54] METHOD AND APPARATUS FOR SWITCHING BETWEEN SOURCE-SYNCHRONOUS AND COMMON CLOCK DATA TRANSFER MODES IN A MULTIPLE PROCESSING SYSTEM

[75] Inventors: Stephen S. Pawlowski, Beaverton; Peter D. MacWilliams, Aloha, both of Oreg.; William S. Wu, Cupertino; Len J. Schultz, San Jose, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,941

[22] Filed: Jun. 25, 1997

[51] Int. Cl.⁶ .............................. G06F 1/12; G06F 13/42
[52] U.S. Cl. .............................. 710/104; 710/60; 710/61; 710/66; 710/127
[58] Field of Search ..................................... 395/284, 307, 395/885, 886, 880, 881; 710/104, 127, 65, 66, 60, 61

[56] References Cited

U.S. PATENT DOCUMENTS

| | | | |
|---|---|---|---|
| 4,633,437 | 12/1986 | Mothersole et al. | 395/894 |
| 5,274,763 | 12/1993 | Banks | 395/250 |
| 5,300,811 | 4/1994 | Suzuki et al. | 257/691 |
| 5,388,072 | 2/1995 | Matick et al. | 365/230.03 |
| 5,446,845 | 8/1995 | Arroyo et al. | 395/250 |
| 5,537,659 | 7/1996 | Nakao | 395/307 |
| 5,548,766 | 8/1996 | Kaneko et al. | 395/886 |
| 5,550,533 | 8/1996 | Pawlowski | 340/825.2 |
| 5,590,369 | 12/1996 | Burgess et al. | 395/290 |
| 5,613,078 | 3/1997 | Kishigami | 395/309 |
| 5,734,877 | 3/1998 | Ries et al. | 395/556 |
| 5,781,746 | 7/1998 | Fleck | 395/306 |

OTHER PUBLICATIONS

"Microprocessors: vol. 1 —Intel 386™, 80286 & 8086 Microprocessors", Intel Corporation, 1994, pp. 1–63, 1–64, 1–68, 1–69, 1–84 –1–86.

Primary Examiner—Ayaz R. Sheikh
Assistant Examiner—Ario Etienne
Attorney, Agent, or Firm—Blakely, Sokoloff, Taylor & Zafman

[57] ABSTRACT

A method and apparatus for transferring data between bus agents in a computer system including a bus operating at a bus clock rate. The method includes the step of receiving a transaction request from a requesting agent including an indication of a plurality of data widths the requesting agent processes. In response to the transaction request, a data transmission is configured in accordance with a data width that both the requesting agent and a responding agent process. The data transmission is performed asynchronously with respect to the bus clock if the data width is one of a first plurality of data widths, otherwise, the data transmission is performed synchronously with respect to the bus clock.

18 Claims, 7 Drawing Sheets

METHOD AND APPARATUS FOR SWITCHING BETWEEN SOURCE-SYNCHRONOUS AND COMMON CLOCK DATA TRANSFER MODES IN A MULTIPLE PROCESSING SYSTEM

FIELD OF THE INVENTION

The present invention relates to the field of data transmission in multiprocessor computer systems.

BACKGROUND OF THE INVENTION

Modern computer systems typically include multiple agents each coupled to a system bus. Typically, the agents are integrated circuit packages with multiple pins coupling each agent to the bus. The agents may include, for example, processors, memory devices, mass storage devices, etc. In order for the computer system to operate properly, agents should be able to communicate effectively with each other via the bus. Because computer systems and computer system agents sometimes evolve separately, computer systems usually include agents that have different capabilities. For example, agents may be capable of transmitting and receiving different data widths. Systems such as these are typically limited to transmitting the smallest data widths of the multiple data widths the agents are capable of transmitting. Typically, this data width must be set once at initialization and cannot be changed during computer system operation. Thus, it is typically not possible to take advantage of an agent's greater capability to transmit data.

Existing computer systems typically transfer data between components or agents in accordance with a predefined clocking scheme. A system bus clock typically clocks data out of a sending device and into a receiving device. Consequently, it takes at least one complete clock cycle of a system bus clock to transfer data from one device to another device. Data can be transferred in a source synchronous fashion in order to increase the speed of data transmission. In source synchronous transmission, a strobe is sent with a data transmission. This strobe latches the data into the receiving device in a time period that is typically shorter than the period of the system bus clock. In present systems capable of source synchronous transmission, this transmission mode must be selected at initialization and cannot be changed during operation of the computer system. For this reason, agents that are not capable of source synchronous transmission prevent a system designer from taking advantage of those agents that are capable of source synchronous transmission.

SUMMARY OF THE INVENTION

A method for transferring data between bus agents in a computer system including a system bus operating at a system bus clock rate is described. The method includes the step of receiving a transaction request from a requesting agent including an indication of a plurality of data widths the requesting agent processes. The method also includes the steps of, in response to the transaction request, configuring a data transmission in accordance with a data width that both the requesting agent and a responding agent process. The data transmission is performed asynchronously with respect to the system bus clock if the data width is one of the first plurality of data widths, otherwise, the data transmission is performed synchronously with respect to the system bus clock.

DETAILED DESCRIPTION

A method and apparatus for transferring data in a computer system is described. In one embodiment, bus agents in the computer system communicate information to each other regarding their data handling capabilities and configure transactions accordingly. Data transmission modes are changed between common clock mode (clocked by a system bus clock) and source synchronous mode (clocked by strobes transmitted by the data source) on a transaction by transaction basis. Data widths are also changed on a transaction by transaction basis.

Figure 1:
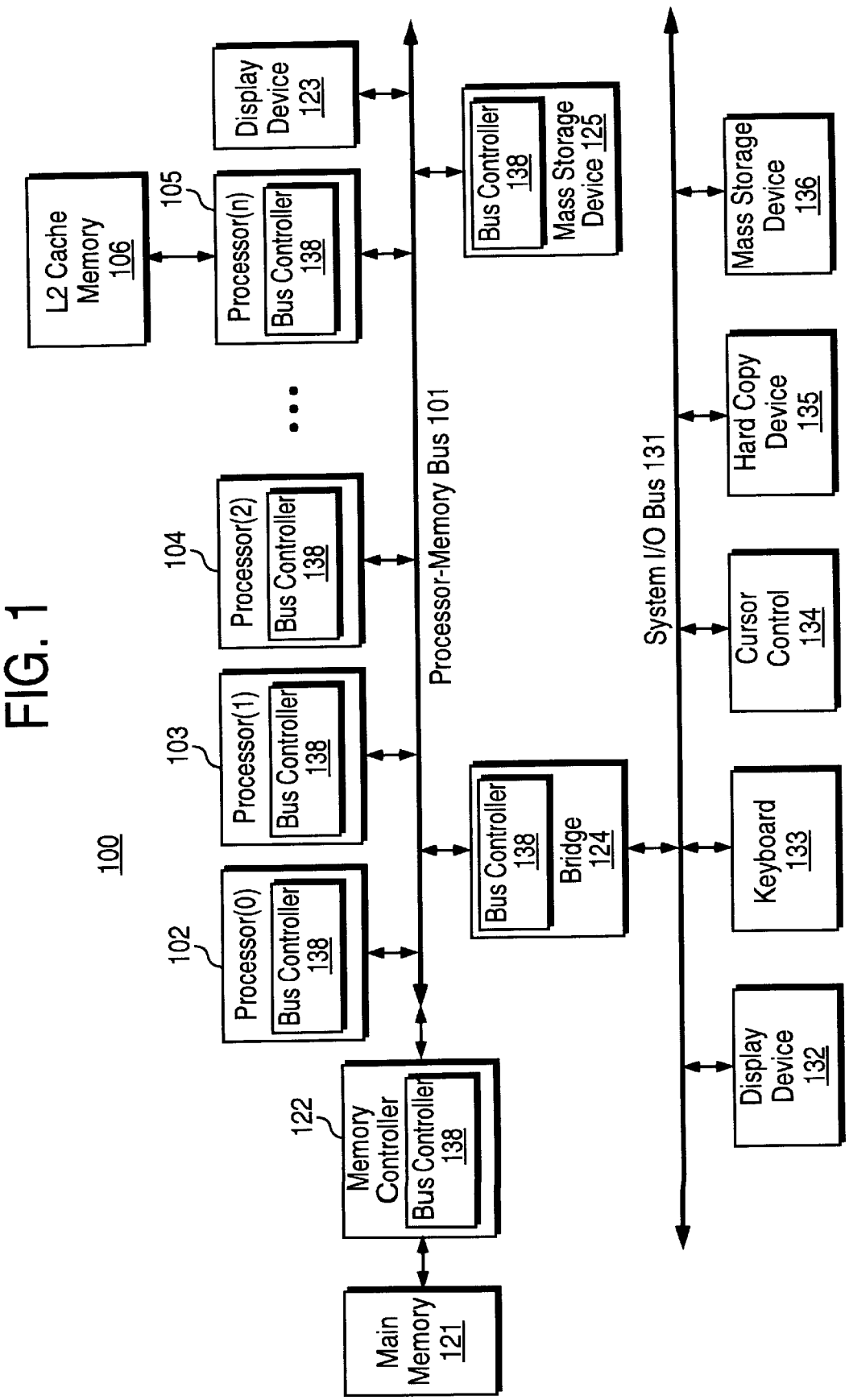
FIG. 1 is a block diagram of a multiple agent computer system according to the present invention.

FIG. 1 is a block diagram of a multi-processor computer system which may be used with embodiments of the present invention. Computer system 100 comprises processor-memory bus 101 for communication between different agents coupled to bus 101, such as processors, bus bridges, memory devices, peripheral devices, etc. Processor-memory bus 101 includes arbitration, address, data and control busses (not shown). In one embodiment, each of processors 102, 103, 104, and 105 include a small, extremely fast internal cache memory (not shown), commonly referred to as a level one (L1) cache memory for temporarily storing data and instructions on the same integrated circuit as its associated processor. In addition, a larger, level two (L2) cache memory 106 is coupled to processor 105 for temporarily storing data and instructions for use by processor 105. In other embodiments, an L2 cache such as memory 106 can be coupled to any one of processors 102–105.

Processor-memory bus 101 provides access to the memory and input/output (I/O) subsystems. Memory controller 122 is coupled to processor-memory bus 101 for controlling access to a random access memory (RAM) or other dynamic storage device 121 (commonly referred to as main memory) for storing information and instructions for processors 102–105. Display device 132, keyboard device 133, cursor control device 134, hard copy device 135, and mass storage device 136 are coupled to system I/O bus 131 and to processor-memory bus 101 through bus bridge 124. Bridge 124 is coupled to processor-memory bus 101 and system I/O bus 131 to provide a communication path or gateway for devices on either processor-memory bus 101 or I/O bus 131 to access or transfer data between devices on the other bus. Bridge 124 is an interface between system I/O bus 131 and processor-memory bus 101. I/O bus 131 communicates information between peripheral devices 132–136.

Processors 102–105, bus bridge 124, mass storage device 125, and memory controller 122 each include a bus controller 138. Bus controller 138 controls communication over processor-memory bus 101 when the agent containing it has control of processor-memory bus 101.

As will be explained more fully below, agents on processor-memory bus 101 have varying capabilities. In particular, some agents can process certain data widths while other agents process other data widths. In addition, according to one embodiment of the present invention agents that can transfer two 8-byte data elements in one clock cycle (or, 128-bit wide data agents) will operate in source synchronous transmission mode. According to one embodiment of the present invention, data transmissions involving an agent that cannot process 128-bit data are transmitted in accordance with a common clocking scheme.

In one embodiment of the present invention, bus activity on processor-memory bus 101 is hierarchically organized into operations, transactions, and phases. An operation is a bus procedure that appears atomic to software, such as reading a naturally aligned memory location. Executing an operation usually requires one transaction but may require multiple transactions, as in the case of deferred replies in which requests and replies are different transactions, or in aligned memory operations which software expects to be atomic. In this embodiment, a transaction is the set of bus activities related to a single request, from request bus arbitration to the completion of the transaction (for example, a normal or implicit writeback response) during the response phase.

In one embodiment, a transaction contains up to six distinct phases. However, certain phases are optional based on the transaction and response type. Alternatively, additional phases could also be added. A phase uses a particular signal group to communicate a particular type of information. In one implementation these phases are:

ARBITRATION PHASE
REQUEST PHASE
ERROR PHASE
SNOOP PHASE
RESPONSE PHASE
DATA TRANSFER PHASE

In one embodiment, the data transfer phase is optional and is used if a transaction is transferring data. The data phase is request initiated if the data is available at the time of initiating a request (for example, for a write transaction). The data phase is response initiated if the data is available at the time of generating the transaction response (for example, for a read transaction). A transaction may contain both a request initiated data transfer and a response initiated data transfer (for) example, a write which is converted to an implicit writeback).

Figure 2:
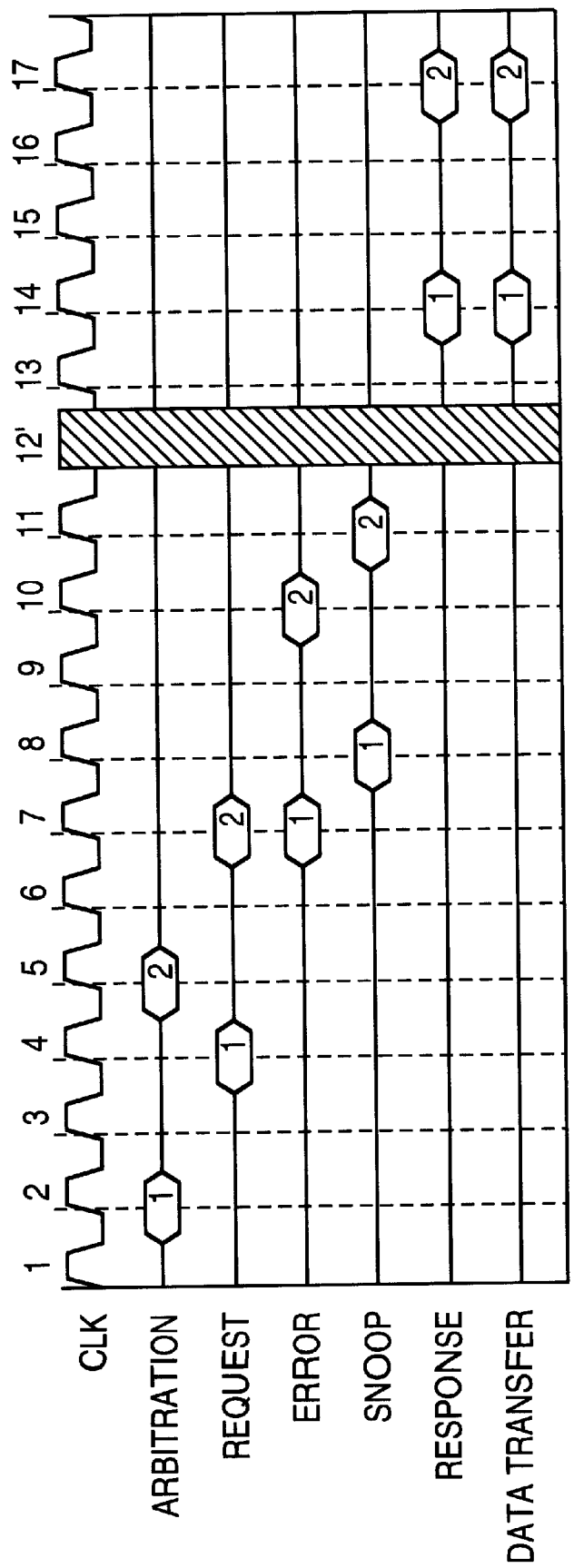
FIG. 2 is a diagram of transaction phases according to an embodiment of the present invention.

Different phases from different transactions can overlap, allowing bus usage to be pipelined and bus performance to be improved. FIG. 2 shows an example of overlap phases for two transactions. Referring to FIG. 2, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clock cycles after ownership is requested.

The second phase is the request phase in which the bus owner drives a request and address information on the bus. In one implementation the request phase is one or more clock cycles after bus ownership is granted (provided there is an arbitration phase), and is two clock cycles long. In the first clock an address signal is given along with the transaction type and sufficient information to begin snooping a memory access. In the second clock, byte enables used to identify which bytes of data should be transferred if the data transfer is less than the data bus width, the transaction identifier used to uniquely identify the transaction in the event a deferred response is to be given to the request, and the requested data transfer lengths are driven, along with other transaction information.

The third phase of a transaction is an error phase. The error phase indicates any immediate error, such as parity errors, triggered by the request. If an error is discovered, an error signal is asserted during the error phase by the agent which detected the error in the transaction. According to one embodiment, when an error is indicated, the transaction is immediately dropped (that is, the transaction progresses no further in the pipeline) and may be redriven by the agent which issued the transaction. Whether the agent reissues the transaction depends on the agent itself. In one implementation, the error phase is three clock cycles after the request phase.

In one embodiment, every transaction that is not canceled because of an error in the error phase has a snoop phase. The snoop phase indicates whether the cache line accessed in a transaction is not valid, valid or modified (dirty) in any agent's cache. In one implementation, the snoop phase is four or more clock cycles from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation the snoop window is a single bus clock.

The response phase indicates whether the transaction failed or succeeded, whether the response is immediate or deferred, whether the transaction will be retried, or whether the transaction includes data phases. If a transaction contains a response initiated data phase, then it enters the data transfer phase coincident with the response phase.

If the transaction does not have a data phase, then that transaction is complete at the response stage. If the requesting agent has write data to transfer or has requested read data, the transaction has a data phase which may extend beyond the response phase in the former case and will be coincident with or extend beyond the response phase in the latter case. The data phase occurs only if a transaction requires a data transfer. The data phase can be response initiated (for example, by the memory controller or another processor) or request initiated.

The bus accommodates deferred transactions by splitting a bus transaction into two independent transactions. The first transaction involves a request by a requesting agent and a response by the responding agent. The response includes the sending of the request data (or completion signals) if the responding agent is ready to respond. In this case, the bus transaction ends. However, if the responding agent is not ready to complete the bus transaction, then the responding agent may send a deferred response over the bus during the response phase. Sending of a deferred response allows other transactions to be issued and not held up by the completion of this transaction. When the responding agent is ready to complete the deferred bus transaction, the responding agent arbitrates for ownership of the bus and sends a deferred reply transaction which includes the requested data (or completion signals) on the bus.

Because, in this embodiment, the bus is of a pipeline nature, multiple transactions can be at different phases of the bus at different times. For example, one transaction can be at the snoop phase, while a second transaction is in the error phase, and a third transaction is in the request phase. Thus, error signals and request signals can both be issued concurrently on the bus even though they correspond to different transactions.

In one embodiment of the present invention, up to eight transactions can be outstanding on the bus at any particular time and up to sixteen transactions can be waiting for a deferred response at any particular time.

Additionally, one embodiment of the present invention also supports an implicit writeback, which is part of a read or write transaction. An implicit writeback occurs when a requesting agent places a request on the bus for a cache line which is stored in a modified state in a cache coupled to the bus. For example, an agent may perform a write transaction over the bus of 8 bytes of data (or some other amount of data less than or equal to a cache line), however, the cache line which includes those 8 bytes is stored in a modified state in another agent's cache. In this situation, the cache which contains the cache line in a modified state (or the agent which is coupled to the cache) issues a "hit modified" signal on the bus during the snoop phase for the transaction. The requesting agent places the 8 bytes of write data onto the bus, which are retrieved by the targeted agent. Then, coincident with the response phase of the transaction, the cache which contains the cache line in a modified state writes the cache line, which is 32 or 64 bytes in one implementation, to the bus. Any of the data in the cache line which was not written by the requesting agent is then merged with the write data from the original data transfer.

An implicit writeback may also occur with a read transaction. For example, a requesting agent may perform a read transaction which targets a memory controller on the bus, but which also hits a modified cache line in a snooping agent's cache memory. In this example, the snooping agent becomes the source agent and provides the requested data, as an implicit writeback, to the memory controller which in turns stores the writeback data into main memory. Also, in this example, the requesting agent takes the implicit writeback data from the bus (referred to as "snarfing" the data). In alternate embodiments, however, the memory controller may perform the snarfing, in which case the cache line will be taken off the bus by the requesting agent and may or may not be taken off the bus by the memory controller.

Figure 3:
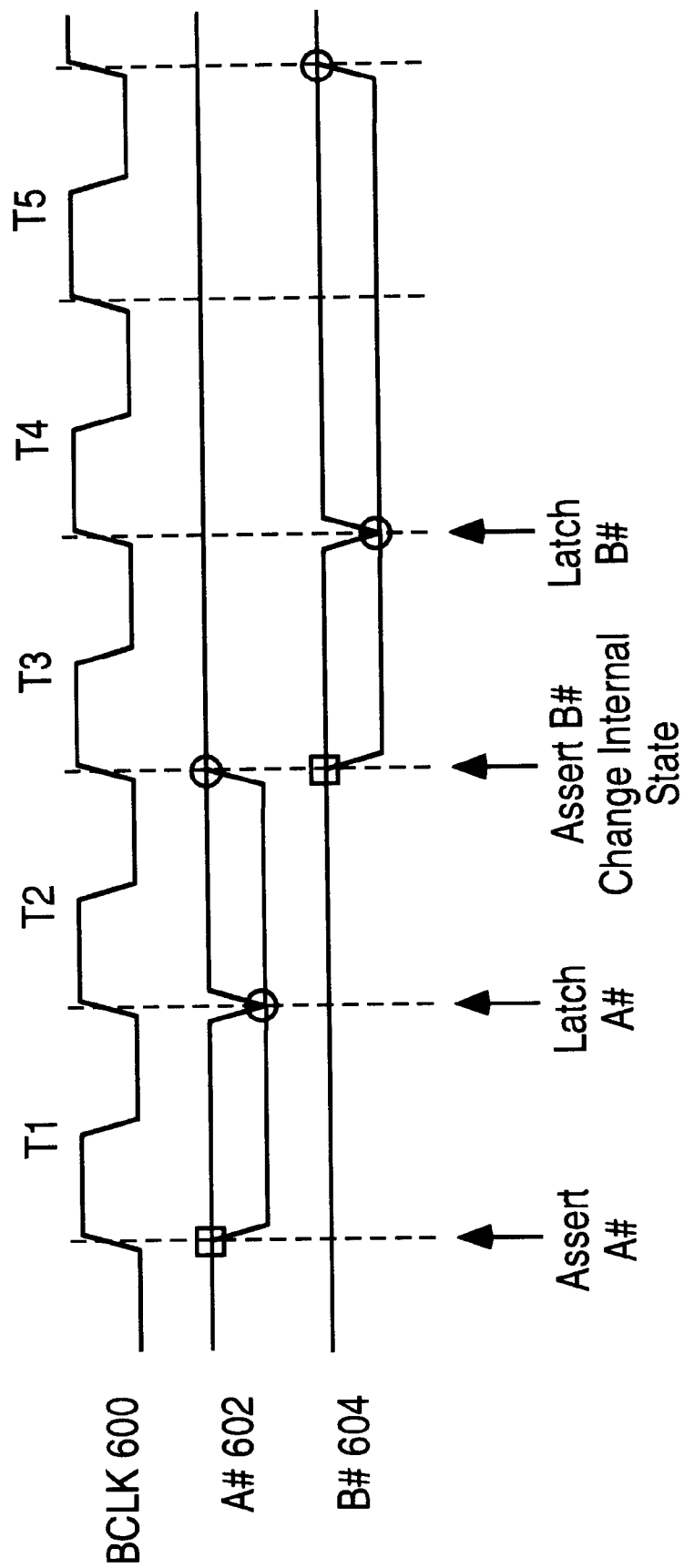
FIG. 3 is a timing diagram illustrating a common clock latched protocol.

FIG. 3 is a timing diagram showing what occurs on the bus during a common clock transaction. In timing diagrams herein, a square symbol indicates that a signal is driven, a circle symbol indicates that a signal is sampled (latched, or captured), and a triangle symbol indicates that the signal is received, or observed.

Signal names herein use uppercase letters, such as ADS#. Signals in a set of related signals are distinguished by numeric suffixes, such as A 4 for address bit 4. A set of signals covering a range of numeric suffixes if denoted as, for example, D[63-0] for data bits 0 through 63. A "#" suffix indicates that the signal is active low. No "#" suffix indicates that the signal is active high. The logic levels at which certain signals are active are merely choices made for particular embodiments and are not essential to the invention. The term "asserted" implies that a signal is driven to its active logic level. The term "deasserted" implies that a signal is driven to its inactive logic level.

Bus clock signal BCLK 600 is active on its rising edge. At the start of clock cycle T1, signal A# 602 is asserted on the bus. At the start of T2, BCLK 600 latches signal A# 602. At the start of T3, B# 604 is asserted in response to the latching of A# 602. A# 602 changes state to its original, inactive state in T2. It can be seen from FIG. 3 that B# 604 is asserted in response to A# 602 two BCLK 600 cycles after A# 602 is asserted.

Figure 4:
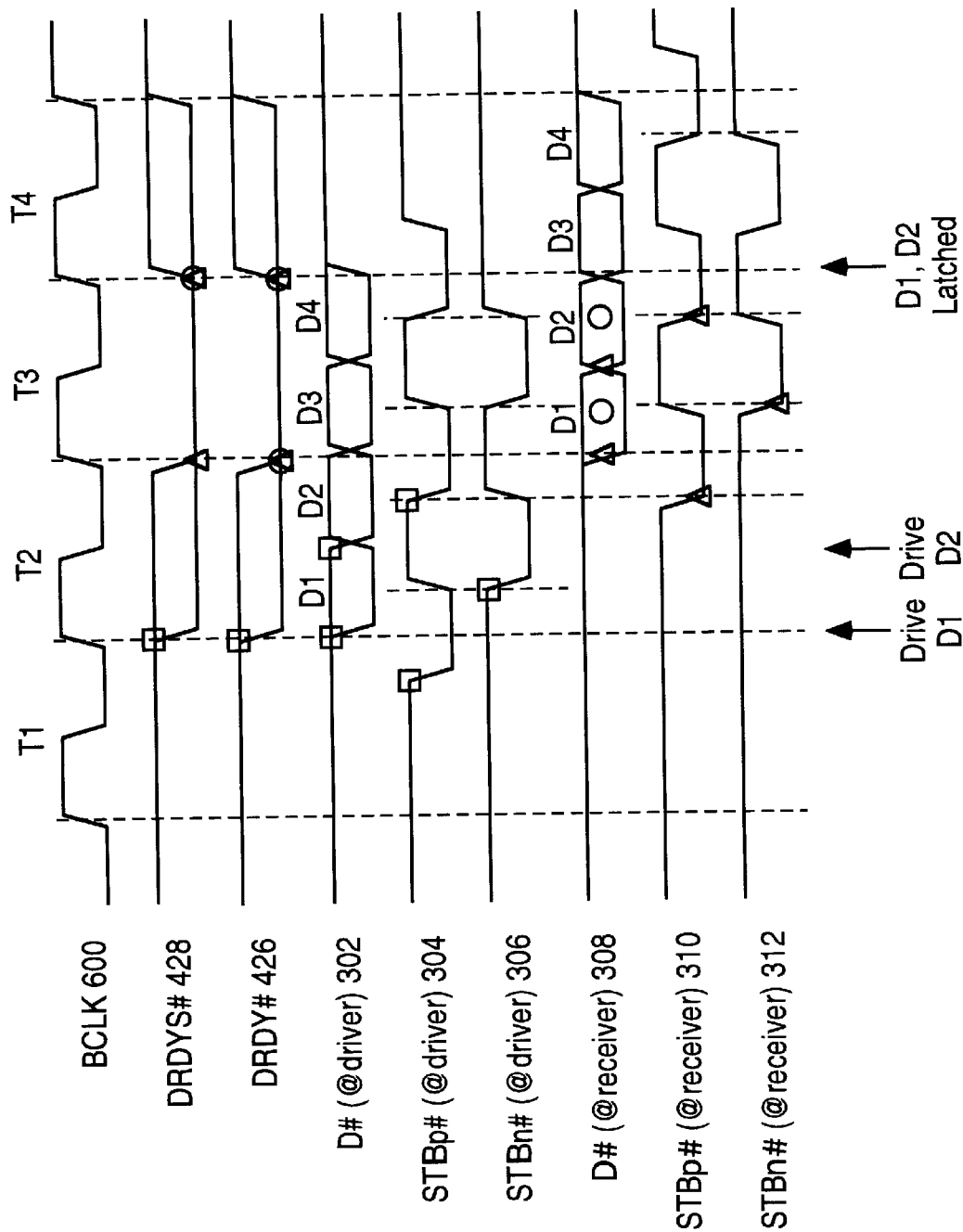
FIG. 4 is a timing diagram illustrating a source synchronous latched protocol according to an embodiment of the present invention.

FIG. 4 is a timing diagram illustrating source synchronous data transmission according to one embodiment. Four chunks of data, D1, D2, D3, and D4 are sent and received as shown in FIG. 4. BCLK 600 operates with its normal frequency just as in the common clock transaction shown in FIG. 3. According to the source synchronous protocol shown in FIG. 4, data is sent and latched with strobes STBp[3:0]# 310 and STBn[3:0]# 312 to allow transfer rates approximately twice the common clock transfer rate with reasonable signal flight times. The source synchronous latched protocol operates the bus at twice the frequency of BCLK 600. Two chunks of data are driven onto the bus in the time it would take to drive one chunk in common clock transmission. Therefore, bandwidth may be doubled without a corresponding increase in the number of signals transmitted.

As explained below with respect to Table IV, signals DRDYS# 428 and DRDY# 426 both active indicate that the sender is sending data in a source synchronous 128-bit mode. D# 302 comprises the data signals as seen by the driver. D# 308 comprises the data signals as seen by the receiver. STBp[3:0]# 304 and STBn[3:0]# 306 are strobe signals as seen by the driver of the strobe signals. STBp[3:0]# 310 and STBn[3:0]# 312 are the strobe signals as seen by the receiver of the data and strobe signals. On both the rising edge and the 50% point of the bus clock, the driver sends new data. On both the 25% point and the 75%, point of the bus clock, the driver sends centered differential strobes STBp[3:0]# 304 and STBn[3:0]# 306. The receiver captures the data with the strobes deterministically.

In one embodiment, the driver must predrive STBp[3:0]# 304 before driving D[63:0]# 302. The driver sends a rising and falling edge on STBp[3:0]# 304 and STBn[3:0]# 306 centered with data. The driver must deassert the strobes after the last data is sent. The receiver captures valid data with both strobe signals, asynchronous to BCLK 600. Signals synchronous to BCLK 600 (DRDYS# 428 and DRDY# 426) indicate to the receiver that valid data has been sent. FIG. 4 illustrate that if both agents are capable of 128-bit data transmission, data can be transmitted in half the time with respect to BCLK 600 as with the common clock protocol as shown in FIG. 3.

Figure 5:
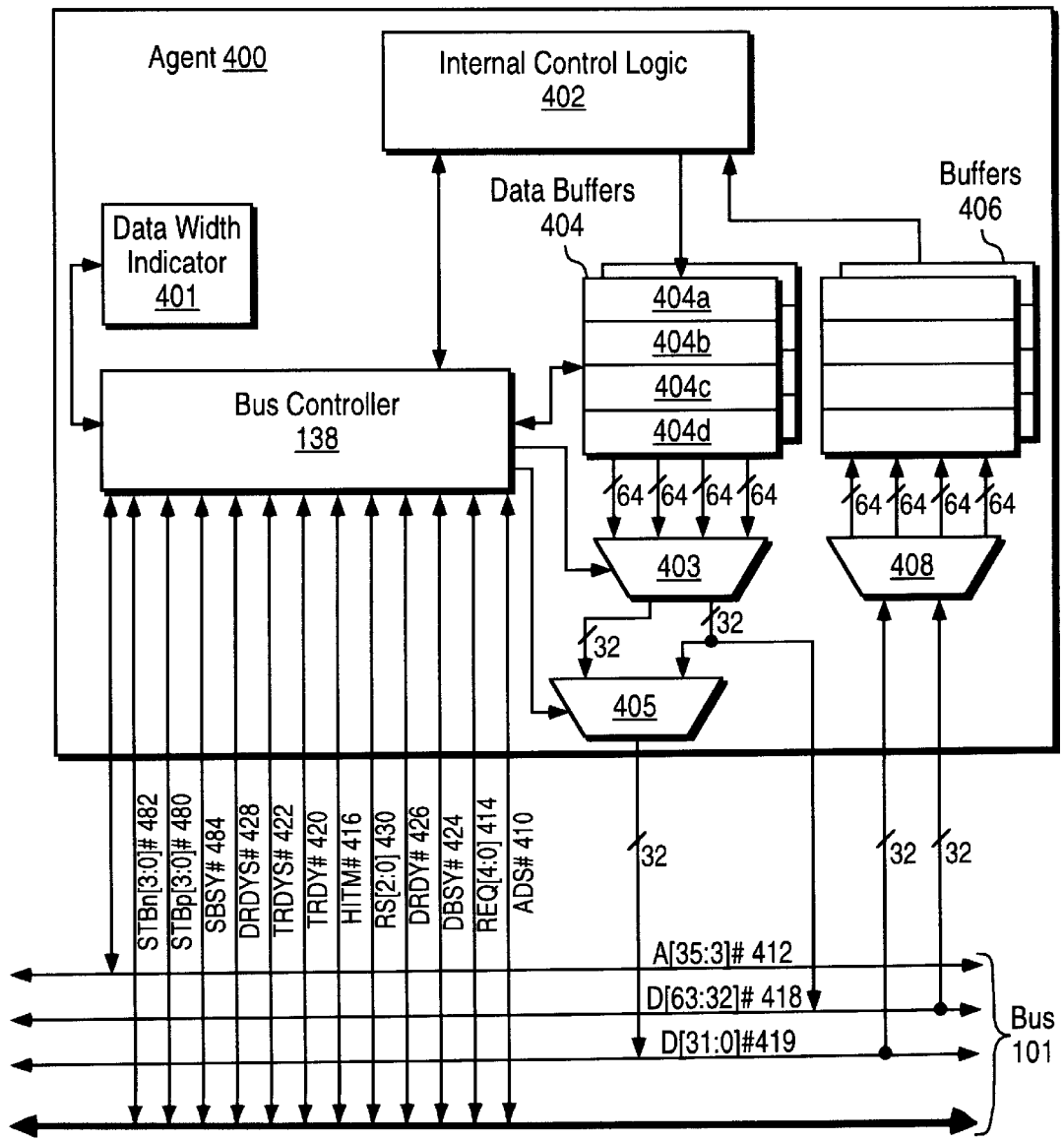
FIG. 5 is a block diagram of an agent according to one embodiment of the present invention.

FIG. 5 is a block diagram showing an agent in more detail according to one embodiment of the present invention. Agent 400 includes a data width indicator 401, internal control logic 402, bus controller 138, data buffers 404 and 406, and multiplexors 403, 405, and 408.

Data width indicator 401 is an indicator of the data transfer widths supported by agent 400. In one embodiment, data width indicator 401 is a two-bit value which encodes the data transfer which is supported by agent 400. Data width indicator 401, according to one embodiment, is a preconfigured value. Indicator 401 can be preconfigured in any of the wide range of convention manners, such as having particular pins of agent 400 connected to particular predetermined voltage levels which are sampled at system reset periods. In other embodiments data width indicator 401 may be reconfigurable. For example, data width indicator 401 may be stored in a memory device or may be part of a configuration register that can be written to by software. Bus controller 138 provides an interface between agent 400 and bus 101. Bus controller 138 transfers various control and address signals between bus 101 and also controls the transfer of data to and from bus 101. As shown, bus 101 has a 64-bit wide data bus. In other embodiments, other data bus widths may be used.

A summary of the signals used with the present invention is shown in Table I below. The interaction of these signals is discussed more fully below.

Table I is a summary of signals used with the present invention including those signals most pertinent to the invention, but is not an exhaustive list of signals transmitted by agent 400 or bus 101.

TABLE I

| Signal | Description |
| --- | --- |
| CLK | The bus clock. |
| ADS# | Address Strobe. Asserted by the requesting agent to indicate the beginning of the Request Phase for a transaction. |
| A[35:3]# | Address. The bus lines used to transfer the address for a request. |
| REQ[4:0]# | Request. Used to encode the particular request of the requesting agent, including the type of request (e.g., read, write, etc.) and length of the transfer. |
| REQb[4:3]# | Data size. Two of the REQ[4:0]# bits. Used by the requesting agent to encode the data transfer widths supported by the requesting agent. The "b" indicates the signals are driven in the second clock cycle of the Request Phase. |
| HITM# | Hit Modified. Asserted by a snooping agent to indicate that the request hit a modified cache line of an agent's cache. |
| DBSY# | Data Bus Busy. Asserted by the agent transferring data to indicate it is using or is about to use the data bus. |
| D[63:0]# | Data. The bus lines used to transfer the data (that is, the data bus). |
| DRDY#, DRDYS# | Data Ready. Asserted by the agent transferring data to indicate that valid data is on the bus and infers the data size supported by the transferring agent. |
| TRDY#, TRDYS# | Target Ready. Asserted by the agent which is receiving data to indicate that the agent is ready to accept the data and infers the data size supported by the receiving agent. |
| RS[2:0]# | Response Status. Asserted by the targeted agent to indicate the status of the response (e.g., Retry Response, Deferred Response, Failure, Implicit Writeback Response, or Normal (with or without data response). |
| SBSY# | Strobe Busy. Asserted by the transferring agent to indicate it is using or is about to use the strobe lines of the bus. |
| STBp[3:0]# STBn[3:0]# | Source synchronous positive and negative data strobes asserted by the transferring agent to capture valid data in the receiver. |

Agent 400 also includes two sets of data buffers 404 and 406. Agent 400 includes two sets of input buffers 406 and two sets of output buffers 404. However, alternate embodiments could include more or fewer data buffers or data buffers that could be used for both input and output rather than having two different sets of buffers.

Data buffers 404 temporarily store data that is being transferred from agent 400 to another agent via bus 101. According to one embodiment of the present invention, each of data buffers 404 comprise four separate buffers, 404a, 404b, 404c and 404d, each capable of storing 64 bits of data. Each of data buffers 404 is input into a multiplexor 403. Multiplexor 403 is controlled by bus controller 138, thereby allowing bus controller 138 to control which 64-bit portion of data is provided to data lines D[63:32]# 418 and D[31:0]# 419 at any particular time. The output of multiplexor 403 is then input into a second multiplexor 405 which is also controlled by bus controller 138. Multiplexor 405 takes the 64 bits of data from multiplexor 403 and places either the upper 32 bits or the lower 32 bits onto the data lines D[31:0]# 419. The group of 32 bits placed on data lined D[31:0]# 419 is dependent upon control signals received from bus controller 138, which are in turn dependent upon the data transfer width for the transaction, as discussed in more detail below. Additionally, the upper 32 bits from multiplexor 403 are also placed onto data lines D[63:32]# 418, thereby making the upper 32 bits available on the data bus for 64-bit wide data transfers.

Data buffers 406 temporarily store data that is being transferred from another agent to agent 400 via bus 101. According to one embodiment of the present invention each of data buffers 406 comprise four separate buffers each capable of storing 64 bits of data. Buffers 406 and multiplexor 408 are essentially the same as buffers 404 and multiplexors 403 and 405, except that they work in the opposite direction (that is, they operate to store data from the bus rather than transfer data to the bus). Data is received from D[31:0]# lines 419 and possibly D[63:32]# lines 418 and placed into one of data buffers 406 via multiplexor 408. Multiplexor 408 provides either 64 bits of data to a buffer 406 or 32 bits of data as the upper or lower 32 bits to a buffer 406, based on control signals from bus controller 138, which are dependent upon the data transfer widths for the transaction as discussed in more detail below.

When agent 400 is issuing a request on the bus, agent 400 provides an indication of the data transfer widths supported by agent 400. In one embodiment this indication is encoded in REQ[4:0]# 414, using REQ[4:3]# asserted in the second clock cycle of the request phase. An encoding of particular data transfer widths supported in this implementation is shown in table II below, in which "0" indicates an inactive signal and "1" indicates an active signal.

TABLE II

| REQb[4:3]# | Description |
| --- | --- |
| 00 | Supports 64-bit data transfers only. |
| 01 | Supports either 128-bit or 64-bit data transfers. |
| 10 | Supports either 64-bit or 32-bit data transfers. |
| 11 | Supports 32-bit data transfers only. |

The proper indication to be provided by agent 400 is based on the data width indicator 401. In one implementation, data width indicator 401 stores one of the four encoding shown in Table II, and can be placed directly on the bus by bus controller 138. If agent 400 is the target of the request issued by anther agent coupled to the bus, then agent 400 also provides, as a target agent, an indication of the data transfer widths supported by agent 400. In one embodiment, this indication is provided using a combination of one or more of DRDY# 426, DRDYS# 428, TRDY# 420, and TRDYS# 422. A summary of the indications provided by these signals, based on what the requesting agent has indicated it supports, as shown in Table III below.

TABLE III

| Data Transfer Widths Supported By Requesting Agent | Type of Request | Signals Provided by Targeted Agent |
| --- | --- | --- |
| 32-bit only | Any | DRDYS# and TRDYS#. DRDY# and TRDY# are not used. |
| 64-bit only | Any | DRDY# and TRDY#. DRDYS# and TRDYS# are not used. |

TABLE III-continued

| Data Transfer Widths Supported By Requesting Agent | Type of Request | Signals Provided by Targeted Agent |
|---|---|---|
| 32- or 64-bit | Read | DRDYS# asserted to indicate 32-bit data transfer, DRDY# asserted to indicate 64-bit data transfer. TRDY# and TRDYS# not asserted by targeted agent. |
| 32- or 64-bit | Write | TRDYS# asserted to indicate 32-bit data transfer, TRDY# asserted to indicate 64-bit data transfer. DRDY# and DRDYS# not asserted by targeted agent. |
| 64- or 128-bit | Read | DRDY# asserted to indicate 64-bit data transfer, DRDY# and DRDYS# both asserted to indicate 128-bit data transfer. TRDY# and TRDYS# not asserted by targeted agent. |
| 64- or 128-bit | Write | TRDY# asserted to indicate 64-bit data transfer, TRDY# and TRDYS# both asserted to indicate 128-bit data transfer. DRDY# and DRDYS# not asserted by targeted agent. |

DRDY# 426 and DRDYS# 428 signals also indicate whether a transfer is in accordance with common clock protocol or source synchronous protocol. This is summarized in Table IV below.

TABLE IV

| Data Transfer | DRDY# | DRDYS# | Transfer Protocol |
|---|---|---|---|
| 32-bit | 0 | 1 | Common Clock |
| 64-bit | 1 | 0 | Common Clock |
| 128-bit | 1 | 1 | Source Synchronous |
| No Transfer | 0 | 0 | No Data Valid |

In embodiments of the present invention in which different agents support up to 32, 64 or 128 bit transfers and which use signals as discussed above in Table III, agents participating in the transaction maintain a record in bus controller 138 of whether the data transfer width indicated as being supported by the requesting agent where 32- or 64-bit, or 64- or 128-bit. For response initiated transactions, a record of DRDY# 426 and DRDYS# 428 is kept. For request initiated transactions or implicit writeback transaction, a record of TRDY# 420 and TRDYS# 422 signals is kept. This record is kept to allow assertion of TRDY# 420 and TRDYS# 422 to indicate either a 64-bit or 128-bit transfer, depending on the original request. A snooping agent monitors TRDY# 420 and TRDYS# 422 signals. If agent 400 snoops a request on the bus which hits a modified cache line in the agent's cache, agent 400, which will be placing writeback data on the bus, indicates the data transfer data width supported by agent 400. In one embodiment, this indication is provided using one or more of the DRDY# 426 and DRDYS# 428 signals. The TRDY# 420 signal and TRDYS# 422 signal are asserted by the targeted agent, as discussed above. A summary of the indications provided by these signals, based on the data transfer widths both the requesting agent and the targeted agent have indicated they support, is shown in Table V below.

TABLE V

| Data Transfer Width Supported By Requesting Agent | Data Transfer Width Supported By Targeted Agent | Request Type | Signals Provided by Snooping Agent |
|---|---|---|---|
| 32-bit only | Any | Any | DRDYS# used. DRDY# not used. |
| 64-bit only | 64-bit or 128-bit data transfers | Any | DRDY# used. DRDYS# not used. |
| 32-bit or 64-bit data transfers | 32-bit only | Any | DRDYS# used. DRDY# not used. |
| 32-bit or 64-bit data transfers | 32-bit or 64-bit data transfers | Any | DRDYS# asserted, DRDY# deasserted to indicate 32-bit writeback data transfer, DRDY# asserted, DRDYS# deasserted to indicate 64-bit writeback transfer. |
| 64-bit or 128-bit data transfers | 64-bit only | Any | DRDY# used. DRDYS# not used. |
| 64-bit or 128-bit data transfers | 64-bit or 128-bit data transfers | Any | DRDY# asserted to indicate 64-bit writeback data transfer, DRDY# and DRDYS# both asserted to indicate 128-bit writeback transfer. |

Figure 6:
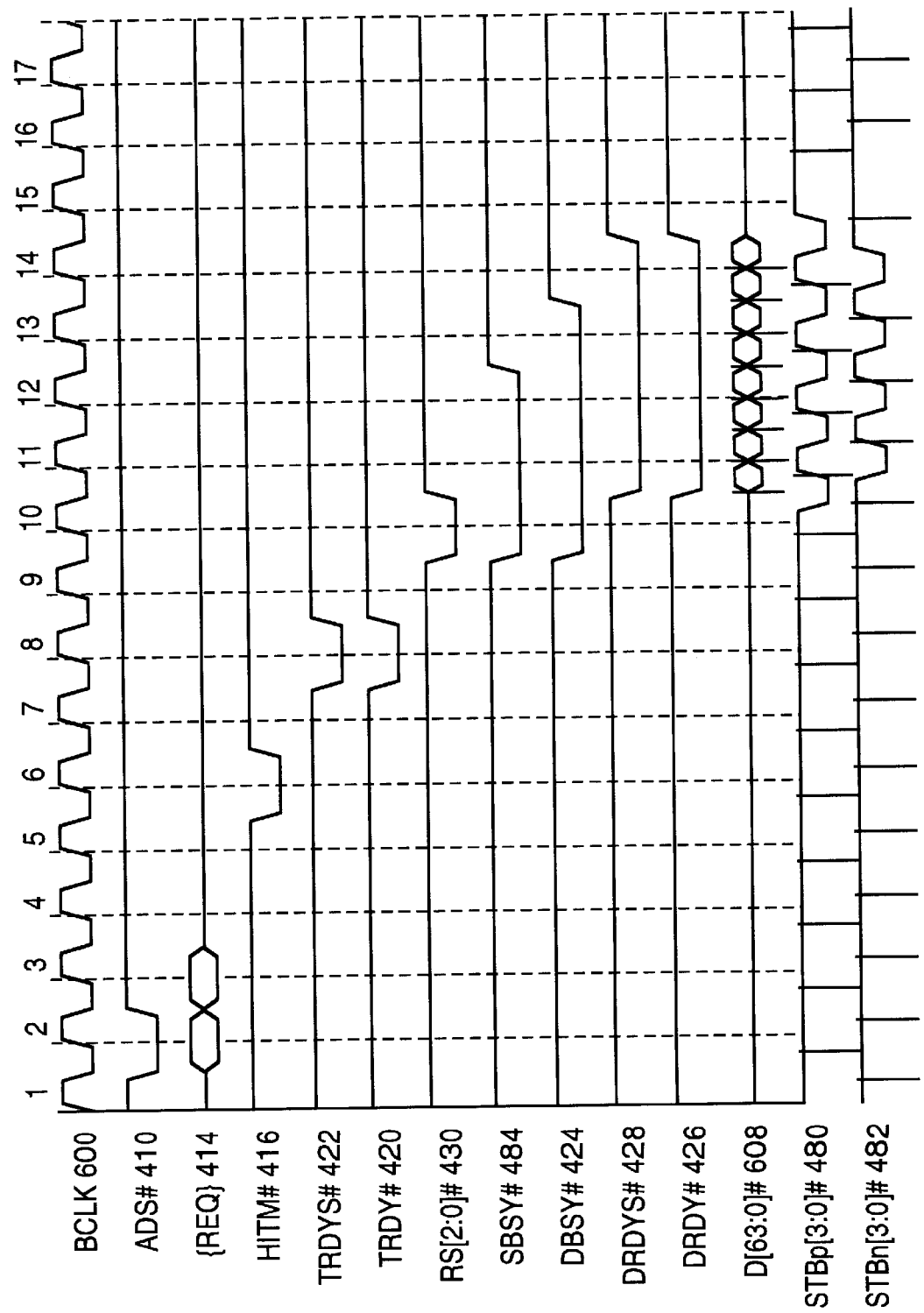
FIG. 6 is a timing diagram illustrating a read 64-byte transaction with implicit write back using source synchronous transfer according to an embodiment of the present invention.

FIG. 6 is a timing diagram showing the events of a 64-byte read transaction with implicit writeback according to source synchronous protocol. In this embodiment, the data bus is 64 bits wide, so the transaction requires the transmission of eight separate chunks of 64 bits each.

In the example of FIG. 6, the requesting agent asserts ADS# 410 in T1 to initiate a 64-byte read transaction. In T2, the requesting agent asserts certain bits of request signals {REQ} 414 to indicate a 64-byte length and that it is a 64-bit/128-bit agent. During the snoop phase in T5, HITM# 416 is asserted by the snooping agent. In T7 the responding agent asserts TRDYS# 422 and TRDY# 420 to indicate that it is ready to accept writeback data and that it is capable of performing 128-bit data transactions in a source synchronous mode. Because the responding, or target agent is responsible for driving the appropriate TRDY#/TRDYS# signals based on the original request received, the snooping agent is relieved of this burden. In T8, the snooping agent samples TRDYS# 422 and TRDY# 420 asserted with deasserted DBSY# 424. In T9, the snooping agent begins the data phase by asserting DBSY# 424 and SBSY# 484. The snooping agent predrives STBp[3:0]# 480 at the 75% point of T9.

The snooping agent begins valid data transfer by asserting DRDYS# 428 and DRDY# 426 and driving valid data on D[63:0]# 608 on the rising edge and at the 50% point of BCLK 600 between T10 and T13. Two 64-bit chunks of data are driven onto the bus in one clock period of BCLK 600. The snooping agent drives a rising and falling edge on both STBp[3:0]# 480 and STBn[3:0]# 482 at the 25% and 75% point of BCLK 600 between T10 and T13 (the center of each data transfer). The snooping agent drives a rising edge on STBp[3:0]# 480 at the 25% point of T14 to turn the bus over to the next agent.

At most one clock cycle after the snooping agent drives the strobes, the centered strobes arrive at the requesting and responding agents to capture the data. With each arriving strobe pair a new chunk of data is captured into the requested and responding agent's buffers. Sometime later, the requesting agent and the responding agent latch the data into the BCLK 600 domain. In T11, the requesting and responding agents sample DRDYS# 428 and DRDY# 426 and know that data has been sent. Thus, FIG. 6 illustrates bus agents sending 128 bits of data in one clock period of a 64-bit bus using source synchronous protocol and changing between common clock and source synchronous protocols on a transaction by transaction basis.

Figure 7:
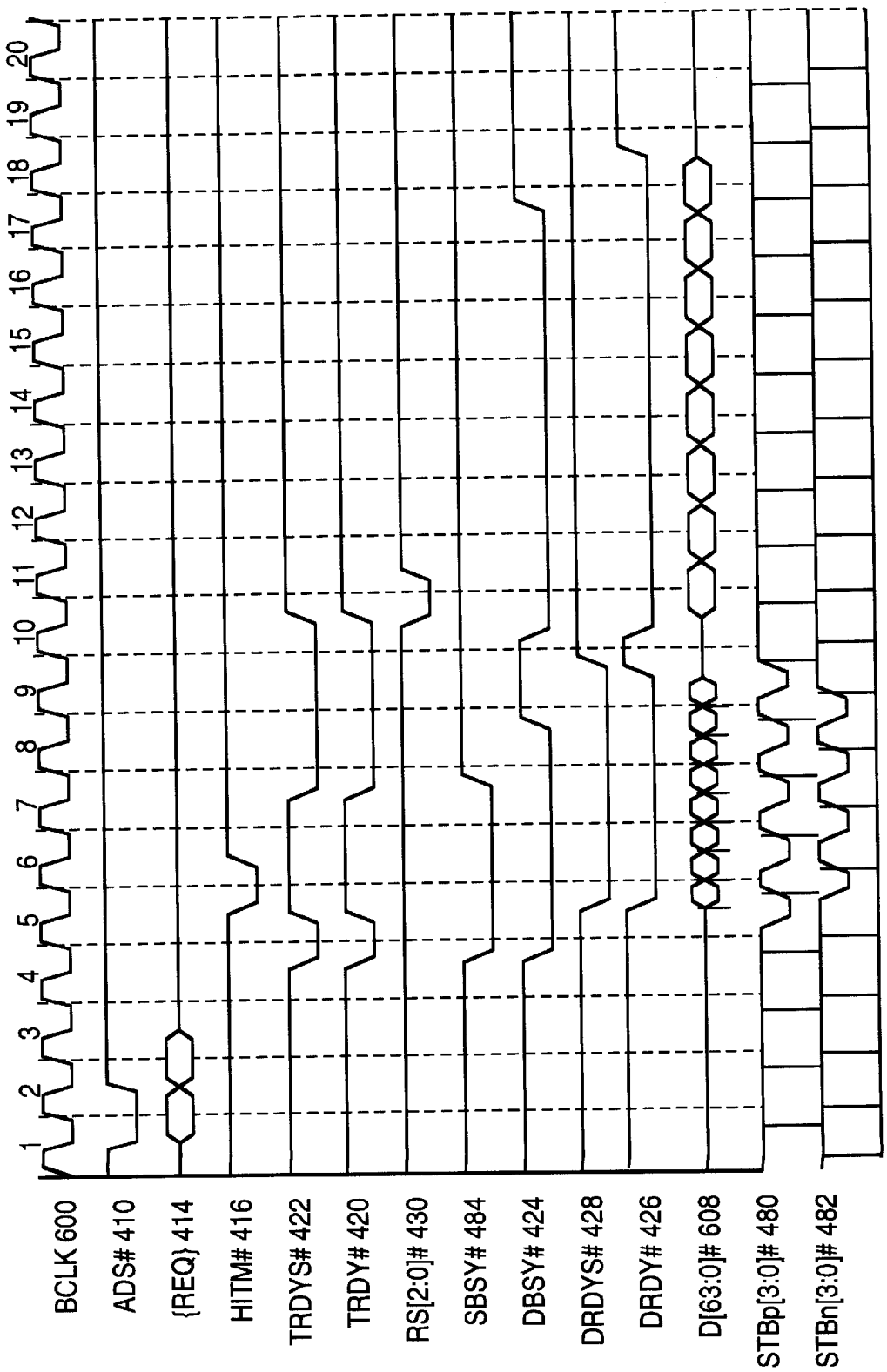
FIG. 7 is a timing diagram illustrating a write 64-byte transaction with implicit writeback according to an embodiment of the present invention in which the snoop agent is not capable of source synchronous transfer.

FIG. 7 is a timing diagram that illustrates, according to one embodiment, agents changing dynamically between common clock and source synchronous transmission modes in the same transaction. FIG. 7 is a timing diagram that illustrates a 64-byte write transaction with implicit writeback in which the snoop agent is not capable of 128-bit transactions and is not capable of operating in source synchronous mode. Assertion of ADS# 410 initiates the transaction in T1. In T2, the requesting agent asserts signals of request signal set {REQ} 414 to indicate a write transaction of 64-byte length. The receiving agent in T4 asserts TRDYS# 422 and TRDY# 420 to indicate that is ready to receive 64 bytes of data, 128 bits per BCLK 600 for a total of 64 bytes. SBSY# 484 and DBSY# 424 are also asserted in T4 in anticipation of the strobe lines of the bus and the data lines of the bus being busy during the transfer. DRDYS# 428 and DRDY# 426 are asserted in T5 to indicate valid data to the receiver. STBp[3:0]# 480 and STBn[3:0]# 482 are predriven in clock 5, and data signals D[63:0]# 608 are driven to begin the 64-byte transfer. The 64-byte transfer occurs from clock cycles 5 through 9 in a manner similar to the transfer illustrated in FIG. 6.

Because HITM# 416 was asserted, the transaction also involves a snoop initiated cache line write-back. After deassertion of TRDYS# 422 and TRDY# 420 in T5, the response agent reasserts both TRDYS# 422 and TRDY# 420 in T7 to request snoop initiated data transfer. In T8 the 64-bit only snoop agent observes active TRDY# 420 and waits for data bus availability to begin data transfer. (Note that the snoop agent does not know of the existence of TRDYS# 422.) The original requesting (writing) agent deasserts DRDYS# 428 in T9 and it remains undriven because the snoop agent is not capable of driving DRDYS# 428. DRDY# 426 is deasserted for one clock cycle during T9. The response agent observes DRDY# 426 and DRDYS# 428 and determines that the data transfer is being performed using a 64-bit data width. RS[2:0]# 430 are asserted in T10 to indicate the status of the response as explained in Table I, in this case an implicit writeback response. In T10, the data bus is available and the snoop agent begins data transfer, driving valid data on D[63:0]# 608. The data transfer continues for eight data transfer clock cycles according to common clock protocol.

In the foregoing specification, the invention has been described with reference to specific exemplary embodiments thereof. For example, the present invention has been described with reference to particular system configurations, signal encodings, and data transmission widths. Various modifications and changes may be made to such specific details as described herein, without departing from the broader spirit and scope of the invention as set forth in the following claims.

What is claimed is:

1. A method for transferring data between bus agents in a computer system including a bus operating at a bus clock rate, comprising the steps of:
 a responding bus agent receiving a transaction request from a requesting agent including an indication of a data width the requesting agent requires for the requested transaction;
 in response to the transaction request, the responding bus agent configuring a data transmission in accordance with the data width required by the requesting agent; and
 performing the data transmission asynchronously with respect to the bus clock if the data width is one of a first group otherwise, performing the data transmission synchronously with respect to the bus clock, wherein each of the requesting agent and the responding agent processes data having widths of the first group and of a second group, and wherein the first group includes greater data widths than the second group.

2. The method of claim 1, wherein asynchronous transmission with respect to the bus clock is faster than synchronous transmission with respect to the bus clock.

3. The method of claim 2, wherein the responding agent processes data having widths of the first group and of a second group, and wherein the first group includes greater data widths than the second group.

4. The method of claim 3, wherein the requesting agent processes data having widths of the first group and of a second group, and wherein the first group includes greater data widths than the second group.

5. The method of claim 4, further comprising the step of, if the transaction request is a request to write data to the responding agent, sending a signal to the requesting agent indicating groups of data widths the responding agent processes.

6. The method of claim 1, wherein the step of performing the data transmission asynchronously comprises the steps of:
 transmitting at least one strobe corresponding to each of a plurality of data chunks comprising the data transmission; and
 using a strobe to latch a data chunk into a buffer of an agent receiving the data transmission.

7. The method of claim 6, wherein strobes corresponding to data chunks are transmitted at a rate that is twice the bus clock rate.

8. The method of claim 7, wherein a data chunk is as wide as the data bus.

9. The method of claim 1, wherein the first group of data widths includes widths greater than 64 bits.

10. The method of claim 1, wherein the first group of data widths comprises 128 bits, and wherein asynchronous data transmission comprises transmission of 128 bits in one cycle of the bus clock.

11. The method of claim 1, wherein the first group of data widths comprises 256 bits, and wherein asynchronous data transmission comprises transmission of 256 bits in one cycle of the bus clock.

12. The method of claim 11, wherein the bus is 64 bits wide.

13. An apparatus for transferring data in a computer system, comprising:
 a bus supporting a plurality of data paths between bus agents of the computer system; and
 a bus agent coupled to a bus that supports a plurality of data paths between bus agents of the computer system, the bus agent comprising:
  a bus controller that controls the bus during certain transactions involving the bus agent and another bus agent on the bus, the bus controller transmitting a plurality of signals over pins of the bus agent, comprising:
   request signals that indicate a particular type of transaction;
   data ready signals that indicate the bus agent is ready to transmit data, a plurality of data widths the bus agent processes, and whether data is transmitted synchronously with respect to a bus clock or asynchronously with respect to the bus clock;

target ready signals that indicate the bus agent is ready to receive data, a plurality of data widths the bus agent processes, and whether data is transmitted synchronously with respect to a bus clock or asynchronously with respect to the bus clock;

data signals transmitted during a transaction; and outgoing strobe signals transmitted with the data signals that latch packets of the data at the other bus agent in a transaction that is asynchronous with respect to the bus clock;

a data width indicator coupled to the bus controller that transmits an indication of data widths processed by the agent to the bus controller;

the bus agent receiving a plurality of signals over the pins of the bus agent, comprising incoming strobe signals received with data signals from the other bus agent that latch packets of data at the bus agent in a transaction that is asynchronous with respect to the bus clock.

14. The apparatus of claim 13, further comprising:

a first plurality of data buffers that temporarily store packets of data entering the agent;

a first multiplexor coupled to the first plurality of data buffers and to the bus controller that selects a packet of data from the bus to store in one of the first plurality of data buffers;

a second plurality of data buffers that temporarily store packets of data exiting the agent; and a second multiplexor coupled to the second plurality of data buffers and to the bus controller that selects a packet of data from the data buffers to transmit to the bus.

15. The apparatus of claim 14, wherein, in the asynchronous transaction, the strobe signals latch the packets of data into the first plurality of data buffers at a rate that is twice a rate of the bus clock.

16. The apparatus of claim 15, wherein the bus is 64 bits wide and the first and second pluralities of data buffers comprise eight, 64-bit data buffers.

17. An apparatus for transferring data in a computer system, comprising:

a 64-bit bus supporting a plurality of data paths between bus agents of the computer system; and a bus agent coupled to a bus that supports a plurality of data paths between bus agents of the computer system, the bus agent comprising:

a bus controller that controls the bus during certain transactions involving the bus agent and another bus agent on the bus, the bus controller transmitting a plurality of signals over pins of the bus agent, comprising:

request signals that indicate a particular type of transaction;

data ready signals that indicate the bus agent is ready to transmit data, a plurality of data widths the bus agent processes, and whether data is transmitted synchronously with respect to a bus clock or asynchronously with respect to the bus clock;

target ready signals that indicate the bus agent is ready to receive data, a plurality of data widths the bus agent processes, and whether data is transmitted synchronously with respect to a bus clock or asynchronously with respect to the bus clock;

data signals transmitted during a transaction; and outgoing strobe signals transmitted with the data signals that latch packets of the data at the other bus agent in a transaction that is asynchronous with respect to the bus clock;

the bus agent receiving a plurality of signals over the pins of the bus agent, comprising incoming strobe signals received with data signals from the other bus agent that latch packets of data at the bus agent in a transaction that is asynchronous with respect to the bus clock;

a data width indicator coupled to the bus controller that transmits an indication of data widths processed by the agent to the bus controller;

a first plurality of 64-bit data buffers that temporarily store packets of data entering the agent;

a first multiplexor coupled to the first plurality of data buffers and to the bus controller that selects a packet of data from the bus to store in one of the first plurality of data buffers;

a second plurality of 64-bit data buffers that temporarily store packets of data exiting the agent; and a second multiplexor coupled to the second plurality of data buffers and to the bus controller that selects a packet of data from the data buffers to transmit to the bus, wherein, in the asynchronous transaction, the strobe signals latch the packets of data into the first plurality of data buffers at a rate that is twice a rate of the bus clock, and wherein the data ready signals indicate that data is transmitted asynchronously with respect to the bus clock when the data ready signals indicate that the agent processes 128-bit data.

18. The apparatus of claim 17, wherein the data target signals indicate that data is transmitted asynchronously with respect to the bus clock when the target ready signals indicate that the agent processes 128-bit data.

* * * * *

UNITED STATES PATENT AND TRADEMARK OFFICE
CERTIFICATE OF CORRECTION

PATENT NO. : 5,919,254
DATED : July 6, 1999
INVENTOR(S) : Pawlowski et al.

It is certified that error appears in the above-identified patent and that said Letters Patent is hereby corrected as shown below:

Column 6,
Line 32, delete "75%," and insert -- 75% --.
Line 59, delete "convention" and insert -- conventional --.

Column 8,
Line 50, delete "anther" and insert -- another --.

Column 11,
Line 16, after "that" insert -- it --.

Signed and Sealed this

Twenty-fifth Day of March, 2003

JAMES E. ROGAN
*Director of the United States Patent and Trademark Office*